US010546040B2

(12) United States Patent
Zhang et al.

(10) Patent No.: US 10,546,040 B2
(45) Date of Patent: Jan. 28, 2020

(54) SYSTEM AND METHOD FOR AUTOMATIC PROVISIONING OF COMPANION RESOURCES IN A WEB HOSTING ENVIRONMENT

(71) Applicant: Microsoft Corporation, Redmond, WA (US)

(72) Inventors: Jennifer X. Zhang, Seattle, WA (US); Jonathan C. Lee, Seattle, WA (US); Ryan A. Nowak, Bellevue, WA (US); Eric H. Wong, Bellevue, WA (US); Vishal R. Joshi, Redmond, WA (US); Clea H. Allington, Auburn, WA (US); Wai Man Yuen, Bellevue, WA (US); David L. A. Anson, Snoqualmie, WA (US); Omar Khan, Kirkland, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 422 days.

(21) Appl. No.: 13/918,466

(22) Filed: Jun. 14, 2013

(65) Prior Publication Data
US 2014/0372862 A1 Dec. 18, 2014

(51) Int. Cl.
*G06F 17/20* (2006.01)
*G06F 16/958* (2019.01)
*H04L 12/24* (2006.01)

(52) U.S. Cl.
CPC ........ *G06F 16/958* (2019.01); *H04L 41/5054* (2013.01)

(58) Field of Classification Search
CPC .......... G06F 15/16; G06F 9/455; G06F 10/00; G06F 13/00; G06F 17/2247; G06F 16/958; G06Q 10/00; G06Q 30/00; H04L 41/5054

USPC ............ 715/229; 717/10, 11, 177; 709/203; 726/26
See application file for complete search history.

(56) References Cited

U.S. PATENT DOCUMENTS

| 6,154,878 | A  | * | 11/2000 | Saboff ........................... 717/173 |
| 7,600,064 | B2 | * | 10/2009 | Knowles ........... G06F 17/30011 455/421 |
| 7,743,147 | B2 | * | 6/2010  | Suorsa ..................... G06F 8/61 709/217 |
| 8,250,215 | B2 |   | 8/2012  | Stienhans et al. |
| 8,589,557 | B1 | * | 11/2013 | Labat ................... G06F 9/5061 709/226 |

(Continued)

OTHER PUBLICATIONS

Beeby et al. "A guide to Web Development 101 using WebMatrix", p. 1-39, published by Ubelly, 2011.*

(Continued)

*Primary Examiner* — Mohammed H Zuberi
(74) *Attorney, Agent, or Firm* — Fiala & Weaver P.L.L.C.

(57) ABSTRACT

A development tool is described herein. The development tool automatically identifies one or more resources associated with a first version of a Web site that is being developed by a user of the tool. The development tool also automatically interacts with at least one entity within a Web hosting environment to cause a companion resource to be provisioned in the Web hosting environment for each local resource so identified. The development tool may also automatically interact with at least one entity within the Web hosting environment to properly configure a published version of the Web site to utilize at least one companion resource.

20 Claims, 4 Drawing Sheets

(56) References Cited

U.S. PATENT DOCUMENTS

| | | | |
|---|---|---|---|
| 8,782,120 B2* | 7/2014 | Jackson | H04L 67/1008 709/202 |
| 2003/0069974 A1* | 4/2003 | Lu | G06F 9/505 709/226 |
| 2006/0020525 A1* | 1/2006 | Borelli | G06Q 30/04 705/34 |
| 2009/0276771 A1* | 11/2009 | Nickolov et al. | 717/177 |
| 2010/0188975 A1* | 7/2010 | Raleigh | G06Q 10/06375 370/230.1 |
| 2011/0138049 A1 | 6/2011 | Dawson et al. | |
| 2011/0153727 A1 | 6/2011 | Li | |
| 2011/0321032 A1* | 12/2011 | Ciccone | G06F 9/445 717/171 |
| 2012/0216133 A1 | 8/2012 | Barker et al. | |
| 2012/0271949 A1 | 10/2012 | Radhakrishnan et al. | |
| 2012/0324005 A1* | 12/2012 | Nalawade | G06Q 50/01 709/204 |
| 2013/0007280 A1 | 1/2013 | Aslam et al. | |
| 2013/0031224 A1 | 1/2013 | Nachtrab et al. | |
| 2013/0312006 A1* | 11/2013 | Hardman | H04L 67/1008 718/105 |
| 2014/0244488 A1* | 8/2014 | Kim | G06Q 20/123 705/39 |

OTHER PUBLICATIONS

Hamre, "A Databse Load Generation Unitility", published online, Mar. 2007, at http://www.drewhamre.com/documents/StressSQL.pdf.*

Gu ("Introducing the Microsoft Web Farm Framework", published online on Sep. 8, 2010 at https://weblogs.asp.net/scottgu/introducing-the-rnicrosoft-web-farm-framework (Year: 2010).*

Rouse, Margaret, "User Self-Provisioning", Retrieved at <<http://searchcloudprovider.techtarget.com/definition/User-self-provisioning>> Retrieved Date: Apr. 27, 2013, pp. 14.

* cited by examiner

SYSTEM AND METHOD FOR AUTOMATIC PROVISIONING OF COMPANION RESOURCES IN A WEB HOSTING ENVIRONMENT

BACKGROUND

Development tools exist that enable developers to build a Web site on a local machine and then publish such Web site to a remote Web hosting environment via a publication process. For the Web site to be published successfully, it is often the case that companion resources that correspond to various resources used by the local version of the Web site must first be provisioned within the remote Web hosting environment. For example, if the local version of the Web site includes a database of a particular type, then a corresponding database must be provisioned within the remote Web hosting environment prior to publishing. In this way, data can be uploaded from the local database to the remote database during the publication process. The published version of the Web site must also be properly configured to utilize the provisioned resources so that the published version of the Web site will run correctly.

Conventional development tools typically do not provide any functionality by which a developer can provision resources in a remote Web hosting environment that are required for publishing a Web site thereto or by which a developer can configure the published Web site to utilize such provisioned resources. Rather, developers are typically required to leave the development tool and interact with the remote Web hosting environment via an alternate interface (e.g., a Web browser) to cause the required resources to be provisioned and properly configured. This can be an arduous and complicated undertaking for the developer as different provisioning and configuration processes may need to be performed for different resource types and/or different remote Web hosting environments. Furthermore, depending upon the experience level of the developer, it is possible that the developer may not be aware of all the resources that must be provisioned within the remote Web hosting environment or how a published version of the Web site should be configured to utilize such resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

A method performed by a development tool for provisioning Web site resources in a Web hosting environment, such as a cloud Web hosting environment, is described herein. In accordance with the method, a determination is made that a user of the development tool has invoked functionality thereof to create a first version of a Web site. In response to the determination, one or more resources associated with the first version of the Web site are identified and, for each resource so identified, an interaction is carried out with at least one entity within the Web hosting environment to cause a companion resource to be provisioned in the Web hosting environment.

The interacting step of the foregoing method may further include interacting with at least one entity within the Web hosting environment to configure a published version of the Web site to utilize at least one companion resource.

In one embodiment of the foregoing method, the one or more resources associated with the first version of the Web site include a database. In accordance with such an embodiment, the interaction carried out with the at least one entity within the Web hosting environment includes an interaction to cause a companion database to be provisioned in the Web hosting environment. In further accordance with such an embodiment, the method may also include automatically assigning at least one of a database name, database user name and database password for the companion database or obtaining at least one of a database name, database user name, and database password for the companion database from the user of the development tool.

In another embodiment of the foregoing method, the one or more resources associated with the first version of the Web site include a Web site name associated with the first version of the Web site. In accordance with such an embodiment, the interaction carried out with the at least one entity within the Web hosting environment includes an interaction to cause a Web site domain name to be provisioned in the Web hosting environment. The Web site domain name may include the Web site name associated with the first version of the Web site.

In yet another embodiment of the foregoing method, the interaction carried out with the at least one entity within the Web hosting environment includes the invocation of at least one application programming interface (API) exposed by the Web hosting environment to cause the companion resource to be provisioned in the Web hosting environment.

In a further embodiment, the foregoing method may further include determining that the provisioning of a particular companion resource within the Web hosting environment cannot be performed due to a quota being reached. In response to such a determination, the user of the development tool may be provided with one or more of an option to pay for the provisioning of the particular companion resource or an option to cancel the provisioning of the particular companion resource.

In a still further embodiment, the foregoing method may further include determining that the provisioning of a particular companion resource within the Web hosting environment has failed. In response to such a determination, an interaction may be carried out with at least one entity within the Web hosting environment at a subsequent time to cause the particular companion resource to be provisioned within the Web hosting environment.

A computer program product is also described herein. The computer program product comprises a computer readable storage device having computer program logic stored thereon. The computer program logic includes first computer program logic and second computer program logic. When executed by a processing unit, the first computer program logic determines that a user of a development tool has invoked functionality thereof to publish a first version of a Web site. The second computer program logic is executed by the processing unit in response to the determination by the first computer program logic. When executed by the processing unit, the second computer program logic identifies one or more resources associated with the first version of the Web site and, for each resource so identified, interacts with at least one entity within a Web hosting environment to cause a companion resource to be provisioned in the Web hosting environment. The Web hosting environment may be, for example, a cloud Web hosting environment.

When executed by the processing unit, the second computer program logic may also interact with at least one entity within the Web hosting environment to configure a published version of the Web site to utilize at least one companion resource.

In one embodiment of the foregoing computer program product, the one or more resources associated with the first version of the Web site include a database. In accordance with such an embodiment, the second computer program logic includes computer program logic that, when executed by the processing unit, interacts with the at least one entity within the Web hosting environment to cause a companion database to be provisioned in the Web hosting environment. In further accordance with such an embodiment, the second computer program logic may further comprise computer program logic that, when executed by the processing unit, automatically assigns at least one of a database name, database user name and database password for the companion database or obtains at least one of a database name, database user name, and database password for the companion database from the user of the development tool.

In another embodiment of the foregoing computer program product, the one or more resources associated with the first version of the Web site include a Web site name associated with the first version of the Web site. In accordance with such an embodiment, the second computer program logic includes computer program logic that, when executed by the processing unit, interacts with the at least one entity within the Web hosting environment to cause a Web site domain name to be provisioned in the Web hosting environment. The Web site domain name may include the Web site name associated with the first version of the Web site.

In yet another embodiment of the foregoing computer program product, the second computer program logic includes computer program logic that, when executed by the processing unit, invokes at least one API exposed by the Web hosting environment to cause the companion resource to be provisioned in the Web hosting environment.

In a further embodiment of the foregoing computer program product, the computer program logic further includes third computer program logic and fourth computer program logic. When executed by the processing unit, the third computer program logic determines that the provisioning of a particular companion resource within the Web hosting environment cannot be performed due to a quota being reached. The fourth computer program logic is executed by the processing unit in response to the determination by the third computer program logic. When executed by the processing unit, the fourth computer program logic provides the user of the development tool with one or more of an option to pay for the provisioning of the particular companion resource or an option to cancel the provisioning of the particular companion resource.

A system is also described herein. The system includes one or more processors and a storage medium that stores computer program logic that is executable by the one or more processors. The computer program logic comprises a development tool that includes resource detection logic and provisioning logic. When executed by the one or more processors, the resource detection logic identifies one or more resources associated with a first version of a Web site that is being developed by a user of the development tool. The one or more resources include at least one database. When executed by the one or more processors, the provisioning logic interacts with at least one entity within a Web hosting environment to cause a companion resource to be provisioned in the Web hosting environment for each resource identified by the resource detection logic. When executed by the one or more processors, the provisioning logic may also interact with at least one entity within the Web hosting environment to configure a published version of the Web site to utilize at least one companion resource. The resource detection logic and the provisioning logic may each be configured to perform their respective functions in response to a determination that the user of the development tool has created the first version of the Web site or that the user of the development tool intends to publish the first version of the Web site.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
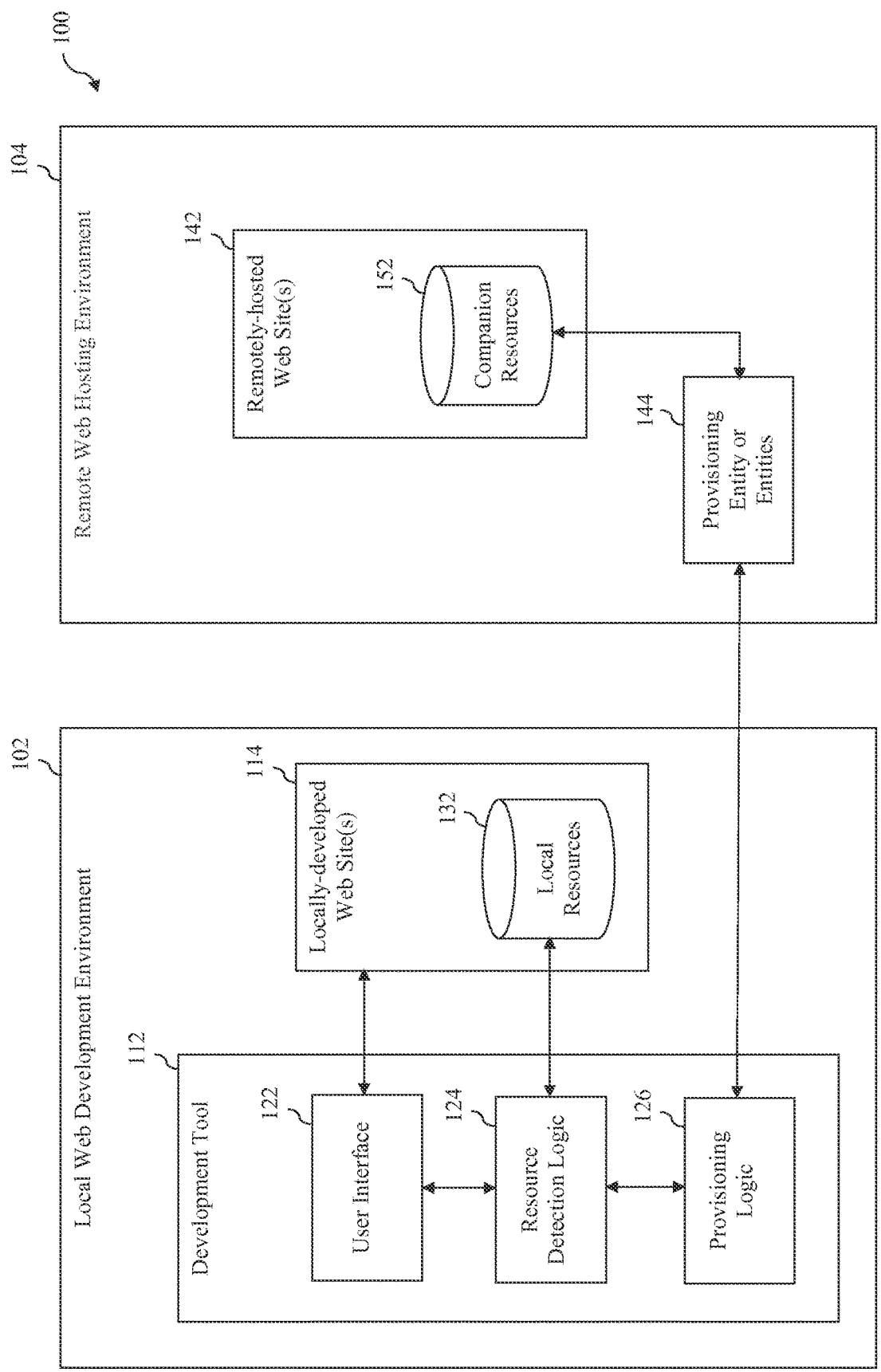
FIG. 1 is a block diagram of a system that includes a development tool that automatically provisions Web site resources in a Web hosting environment in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

A development tool is described herein. The development tool automatically identifies one or more resources associated with a first version of a Web site that is being developed by a user of the tool. The development tool also automatically interacts with at least one entity within a Web hosting environment to cause a companion resource to be provisioned in the Web hosting environment for each resource so identified. By automatically causing companion resources to be provisioned in this manner, the development tool facilitates the successful publishing of the first version of the Web site to the Web hosting environment.

As discussed in the Background Section above, conventional development tools typically do not provide any functionality by which a developer can provision in a remote Web hosting environment the resources that are required for publishing a Web site thereto or by which a developer can configure the published Web site to utilize such provisioned resources. Rather, developers are typically required to leave the development tool and interact with the remote Web hosting environment via an alternate interface (e.g., a Web browser) to cause the required resources to be provisioned and properly configured. This can be an arduous and complicated undertaking for the developer as different provisioning and configuration processes may need to be performed for different resource types and/or different remote Web hosting environments. Furthermore, depending upon the experience level of the developer, it is possible that the developer may not be aware of all the resources that must be provisioned within the remote Web hosting environment or how a published version of the Web site should be configured to utilize such resources.

Embodiments of a development tool described herein address these issues by automatically inspecting a first version of a Web site developed using the tool to determine which resources should be provisioned within a Web hosting environment to ensure successful publishing and operation of the Web site. Furthermore, embodiments described herein address these issues by automatically carrying out the appropriate interaction(s) with the Web hosting environment to cause the required resources to be provisioned. The embodiments described herein may also carry out the appropriate interaction(s) with the Web hosting environment to properly configure a published version of the Web site to utilize such provisioned resources. These features of the development tool advantageously unburden developers from having to carry out these steps manually, thereby making the development process easier and more efficient.

Some exemplary implementations will now be described to help illustrate the foregoing features. In particular, Section II, below, describes an example development tool that automatically provisions companion resources in a Web hosting environment as well as example methods for performing the same function. Section III, below, describes an example processor-based computer system that may be used to implement certain features described herein. Section IV provides some concluding remarks.

II. Example Development Tool that Automatically Provisions Companion Resources in a Web Hosting Environment FIG. 1 depicts a block diagram of an example system 100 in which embodiments may be implemented. System 100 is presented herein by way of example only and is not intended to be limiting. Persons skilled in the relevant art(s) will appreciate that embodiments may be implemented in systems other than that shown in FIG. 1.

As shown in FIG. 1, system 100 includes a local Web development environment 102 and a remote Web hosting environment 104. Local Web development environment 102 includes components and functionality utilized by a developer (or other user) to build a local version of a Web site. As used herein, the term "local" is intended to mean accessible to the developer without having to interact with remote Web hosting environment 104. Local Web development environment 102 also includes components and functionality that enables the developer to publish the local version of the Web site to remote Web hosting environment 104 for hosting thereon. As used herein, the term "remote" is intended to mean accessible to the developer via interaction with remote Web hosting environment 104.

As further shown in FIG. 1, local Web development environment 102 includes a development tool 112 and one or more locally-developed Web sites 114. Development tool 112 comprises a computer program, or set of computer programs, that when executed by a processor-based computer system, enable a user thereof to at least build and publish Web sites. Development tool 112 may also enable a user thereof to develop Web applications and produce content that can be accessed via a Web site. In one exemplary embodiment, development tool 112 comprises a version of Microsoft® WebMatrix®, published by Microsoft Corporation of Redmond, Wash. In another exemplary embodiment, development tool 112 comprises a version of Microsoft® Visual Studio®, published by Microsoft Corporation of Redmond, Wash. However, these are examples only. Development tool 112 may comprise a variety of other computer program(s) designed to enable a user thereof to build and publish Web sites.

Locally-developed Web site(s) 114 comprise Web sites that are being developed by a user of development tool in local Web development environment 102. Each locally-developed Web site 114 comprises one or more resources, denoted local resources 132, which are stored locally with respect to a processor-based computer system upon which development tool 112 is executing. For example and without limitation, such local resources 132 may be stored on a hard drive of a processor-based computer system upon which development tool 112 is executing or in some other storage medium accessible to such processor-based computer system.

Remote Web hosting environment 104 is intended to represent components and functionality used to allow individuals and/or organizations to make their Web sites accessible to others via the World Wide Web. Remote Web hosting environment 104 may be run, for example, by an enterprise that provides Web hosting services. Such services may be offered for free or in return for money or other consideration.

Remote Web hosting environment 104 comprises storage devices that store Web sites, denoted remotely-hosted Web site(s) 142, and Web servers that enable such Web sites to be served to users browsing the World Wide Web. In one embodiment, remote Web hosting environment 104 comprises a cloud Web hosting environment. As will be appreciated by persons skilled in the relevant art(s), a cloud Web hosting environment is one that provides powerful, scalable and reliable hosting based on clustered load-balanced servers and utility billing. A cloud hosted Web site may be more reliable than alternatives since other computers in the cloud can compensate when a single piece of hardware goes down. Also, local power disruptions or even natural disasters are less problematic for cloud hosted Web sites, as cloud Web hosting is decentralized. Cloud Web hosting also allows providers to charge users only for resources consumed by the user, rather than a flat fee for the amount the user expects they will use, or a fixed cost upfront hardware investment. Examples of cloud Web hosting services include Microsoft® Windows Azure™ offered by Microsoft Corporation of Redmond, Wash., and Amazon Web Services®, offered by Amazon Web Services, LLC of Seattle, Wash.

As further shown in FIG. 1, development tool 112 comprises a number of components, including a user interface 122, resource detection logic 124 and provisioning logic 126. User interface 122 comprises an interface that enables a user of development tool 112 to create, edit, store, and publish locally-developed Web site(s) 114. For example, in one embodiment, user interface 122 comprises a graphical user interface (GUI) that is rendered to a display and that includes elements that a user can interact with to create, edit, store and publish locally-developed Web site(s) 114. Interaction with such GUI may be accomplished using standard input devices such as a keyboard, a pointing device (e.g., mouse), and/or a touch screen. However, this is one example only, and other types of interfaces may be used to implement user interface 122.

Resource detection logic 124 comprises logic within development tool 112 that operates to automatically identify local resources 132 associated with locally-developed Web site(s) 114 that are being developed by a user of development tool 112. Provisioning logic 126 comprises logic that automatically interacts with at least one entity within remote Web hosting environment 104 to cause a resource to be provisioned in remote Web hosting environment 104 for each local resource identified by resource detection logic 124. Such resources are denoted companion resources 152. Each companion resource 152 corresponds logically to a local resource 132. There need not be any direct or indirect ties between each local resource 132 and its corresponding companion resource 152. By automatically causing companion resources 152 to be provisioned in this manner, development tool 112 facilitates the successful publishing of a local version of a Web site to remote Web hosting environment 104. For example, by operating in this manner, development tool 112 facilitates the successful publishing of a local-developed Web site 114 having local resources 132 to a remotely-hosted Web site 142 having companion resources 152.

Provisioning logic 126 may also include logic that automatically interacts with at least one entity within remote Web hosting environment 104 to properly configure remotely-hosted Web site 142 to utilize one or more of companion resources 152. By automatically configuring remotely-hosted Web site 142 in this manner, development tool 112 facilitates the successful operation of remotely-hosted Web site 142.

Figure 2:
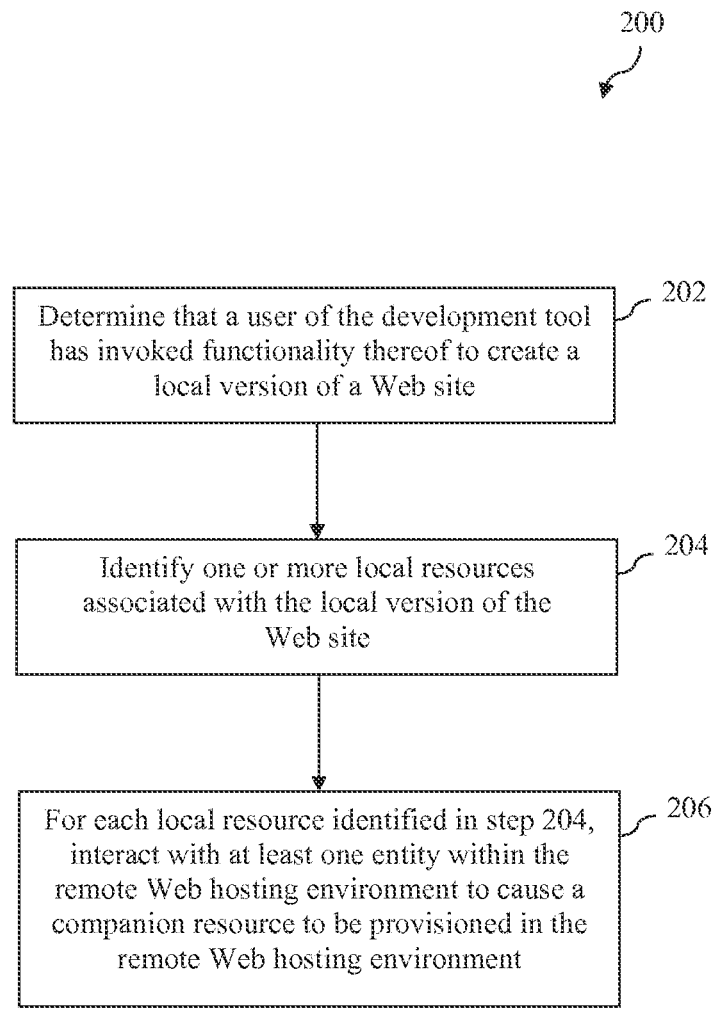
FIG. 2 depicts a flowchart of a method performed by a development tool for provisioning Web site resources in a Web hosting environment in accordance with an embodiment.

One manner in which development tool 112 may operate to cause companion resources 152 to be provisioned in remote Web hosting environment 104 will now be further described with respect to flowchart 200 of FIG. 2. Although the method of flowchart 200 will be described with continued reference to components of system 100, persons skilled in the relevant art(s) will appreciate that the method is not limited to that implementation. Rather, the method of flowchart 200 may be implemented by other components or systems entirely.

In one embodiment, the method of flowchart 200 is only performed when an active network connection exists between local Web development environment 102 and remote Web hosting environment 104. In further accordance with such an embodiment, the method of flowchart 200 may only performed when a user of development tool 112 has signed into an account maintained or recognized by remote Web hosting environment 104 via such active connection. However, this example is not intended to be limiting and in other implementations certain steps of flowchart 200 may be performed in the absence of an activate network connection between local Web development environment 102 and remote Web hosting environment 104 or without requiring a user to sign in to an account maintained by remote Web hosting environment 104.

As shown in FIG. 2, the method of flowchart 200 begins at step 202 in which it is determined that a user of development tool 112 has invoked functionality thereof to create a local version of a Web site (e.g., a locally-developed Web site 114). This detection step may be performed for example, by user interface 122, which determines that the user is creating a local version of a Web site based on user interaction therewith. Such detection may occur, for example, in response to an explicit user command to create a local version of a Web site or inferred from user behavior or actions taken in association with creating a local version of a Web site.

In response to at least the determination made in step 202, step 204 and step 206 are performed. During step 204, resource detection logic 124 identifies one or more local resources (e.g., local resources 132) associated with the local version of the Web site. Such local resources may include, for example, one or more databases. Such databases may comprise for example, an SQL Server® database or a MySQL® database, although these are examples only and are not intended to be limiting. Such local resources may also include a Web site name associated with the local version of the Web site. Still other types of local resources associated with the local version of the Web site may be identified during step 204.

During step 206, provisioning logic 126 interacts with at least one remote entity within remote Web hosting environment 104 to cause a companion resource to be provisioned within remote Web hosting environment 104 for each local resource that was identified during step 204. In the embodiment shown in FIG. 1, the companion resources are denoted companion resources 152 and the system(s) or device(s) within remote Web hosting environment 104 that perform the provisioning function are referred to as provisioning entity or entities 144. In one embodiment, remote Web hosting environment 104 exposes one or more application programming interfaces (APIs) that are invoked by remote provisioning logic 126 to cause provisioning entity or entities 144 to provision a companion resource in remote Web hosting environment 104.

In an embodiment in which one of the local resources identified in step 204 is a local database, step 206 may comprise interacting with provisioning entity or entities 144 within remote Web hosting environment 104 to cause a companion database to be provisioned in remote Web hosting environment 104. Such interaction may further comprise, for example, determining a type of the local database (e.g., SQL Server® database or MySQL® database) and then interacting with provisioning entity or entities 144 within remote Web hosting environment 104 to cause a database of compatible type to be provisioned within remote Web hosting environment 104. In still further embodiments, step 206 may comprise automatically assigning at least one of a database name, database user name and database password for the companion database. Alternatively, step 206 may comprise obtaining from the user of development tool 112 (e.g., via user interface 122) at least one of a database name, database user name and database password for the companion database.

In an embodiment in which one of the local resources identified in step 204 is a Web site name associated with the local version of the Web site, step 206 may comprise interacting with provisioning entity or entities 144 within remote Web hosting environment 104 to cause a Web site domain name to be provisioned in remote Web hosting environment 104. Such Web site domain name may include the Web site name associated with the local version of the Web site. For example, if the user of development tool 112 has assigned a name of "WebMatrixAzureDemo" to the local version of the Web site, a domain name "WebMatrixAzureDemo.azurewebsites.net" may be provisioned in remote Web hosting environment 104. In further embodiments, the user of development tool 112 may be given the option of specifying all or part of the domain name to be provisioned in remote Web hosting environment 104 (e.g., via user interface 122).

Although the preceding description indicated that the provisioning of companion resources occurs automatically, it is possible that such operations may be controlled, at least to some extent, by the user of development tool 112. For example, upon detecting that a user is creating a local version of a Web site, user interface 122 may present a provisioning dialog to the user that asks the user if he/she wishes to create a Web site in remote Web hosting environment 104. If the user indicates that such a site should be created, then the automatic provisioning process described above may occur. Such a provisioning dialog may also be used to obtain user input regarding which resources should be provisioned.

Although only a few examples of local and companion resources are described above, such examples are not intended to be limiting. Persons skilled in the relevant art(s) will readily appreciate that the embodiments described herein may detect other types of local resources and provision other types of companion resources depending upon the implementation.

In one embodiment, the method of flowchart 200 may further include determining by development tool 112 that the provisioning of a particular companion resource in remote Web hosting environment 104 cannot be performed due to a quota being reached on remote Web hosting environment 104. In response to this determination, development tool 112 may provide the user thereof with one or more of an option to pay for the provisioning of the particular companion resource or an option to cancel the provisioning of the particular companion resource (e.g., via user interface 122).

In another embodiment, the method of flowchart 200 may further include determining that the provisioning of a particular companion resource in remote Web hosting environment 104 has failed for some reason. In response to this determination, development tool 112 may save information relating to the provisioning of the particular companion resource and then interact with remote Web hosting environment 104 at a later time to reinitiate the provisioning process. Such interaction may occur in a manner that does not require any input from the user of development tool 112. In another embodiment, in response to a determination that the provisioning of a particular companion resource in remote Web hosting environment 104 has failed for some reason, steps may be taken by development tool 112 and/or remote Web hosting environment 104 to de-provision all companion resources for the Web site, effectively "cleaning things up" on remote Web hosting environment 104.

In still another embodiment, the interacting described in step 206 of flowchart 200 may further include interacting with at least one remote entity within remote Web hosting environment 104 to configure a published version of the Web site (e.g., remotely-hosted Web site 142) to utilize at least one of the companion resources provisioned during step 206. Such configuration may entail properly linking the companion resources, taking into account interrelationships between companion resources and ensuring that the published version of the Web site will run correctly.

In the foregoing description of flowchart 200, the process for provisioning companion resources is triggered by detecting that the user has invoked functionality of development tool 112 to create a local version of a Web site. However, in alternate embodiments, the process may be triggered in other ways. For example, in one embodiment, the process may be triggered when the user invokes functionality of development tool 112 to open an existing locally-developed Web site 114. In another embodiment, the process may be triggered when the user invokes functionality of development tool 112 to publish an existing locally-developed Web site 114. The operation of such an embodiment is shown in flowchart 300 of FIG. 3.

Figure 3:
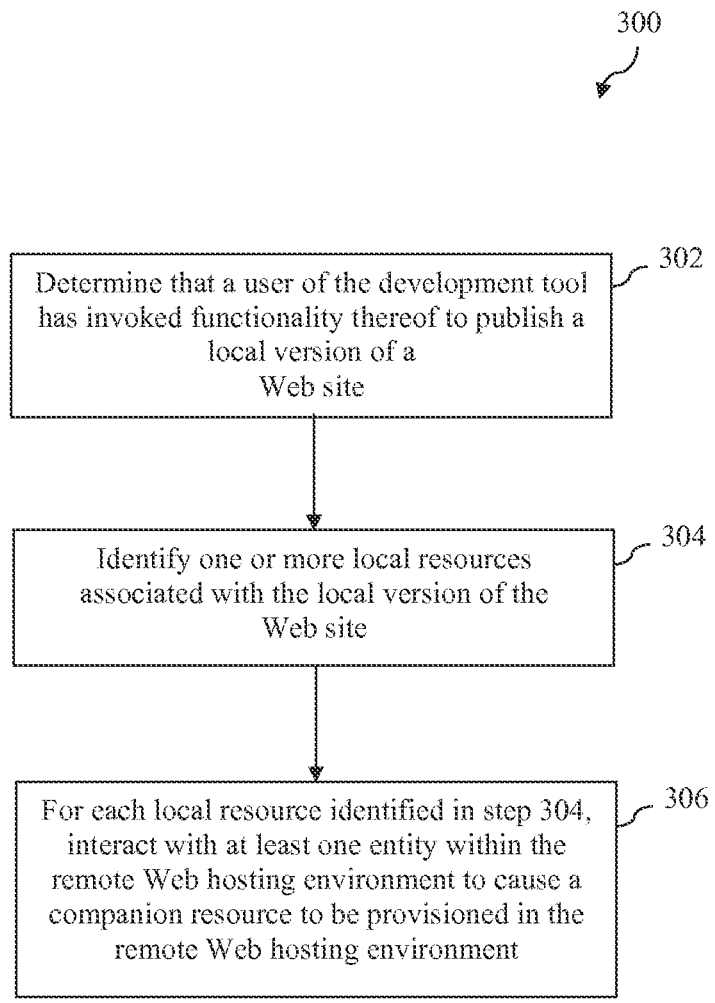
FIG. 3 depicts a flowchart of another method performed by a development tool for provisioning Web site resources in a Web hosting environment in accordance with an embodiment.

As shown in FIG. 3, the method of flowchart 300 begins at step 302, in which it is determined that a user of development tool 112 has invoked functionality thereof to publish a local version of a Web site (e.g., a locally-developed Web site 114). This detection step may be performed for example, by user interface 122, which determines that the user is publishing a local version of a Web site based on user interaction therewith. Such detection may occur, for example, in response to an explicit user command to publish a local version of a Web site or inferred from user behavior or actions taken in association with publishing a local version of a Web site.

In response to at least the determination made in step 302, step 304 and step 306 are performed. During step 304, resource detection logic 124 identifies one or more local resources (e.g., local resources 132) associated with the local version of the Web site. This step may involve identifying one or more local resources associated with the local version of the Web site for which companion resources have not already been provisioned in remote Web hosting environment 104. For example, companion resources may have already been provisioned for certain local resources when the local version of the Web site was first created. However, in the interim, the user may have added new local resources to the Web site. Thus, during step 304, resource detection logic 124 may detect these newly-added resources. Various example of local resources were provided above in reference to FIG. 2.

During step 306, provisioning logic 126 interacts with provisioning entity or entities 144 within remote Web hosting environment 104 to cause a companion resource to be provisioned within remote Web hosting environment 104 for each local resource that was identified during step 304. In one embodiment, remote Web hosting environment 104 exposes one or more APIs that are invoked by remote provisioning logic 126 to cause provisioning entity or entities 144 to provision a companion resource in remote Web hosting environment 104. Various examples of companion resources that may be provisioned were provided above in reference to FIG. 2.

The foregoing description of FIGS. 1-3 distinguished between a "local" Web development environment having "local resources" and a "remote" Web hosting environment having companion resources. However, it is to be understood that the techniques described herein are not limited to automatically provisioning and configuring companion resources for locally-developed Web sites having locally-stored resources only. Rather, the techniques described herein can generally be applied to automatically provision and configure companion resources for resources of any Web site, wherever developed or stored. For example, the Web site being developed using development tool 112 may be stored remotely with respect to a machine on which development tool 112 is being executed. In this case, the techniques described herein can still be applied to automatically provision and configure companion resources to those utilized by the Web site being developed in this manner.

III. Example Processor-Based System Implementation

Figure 4:
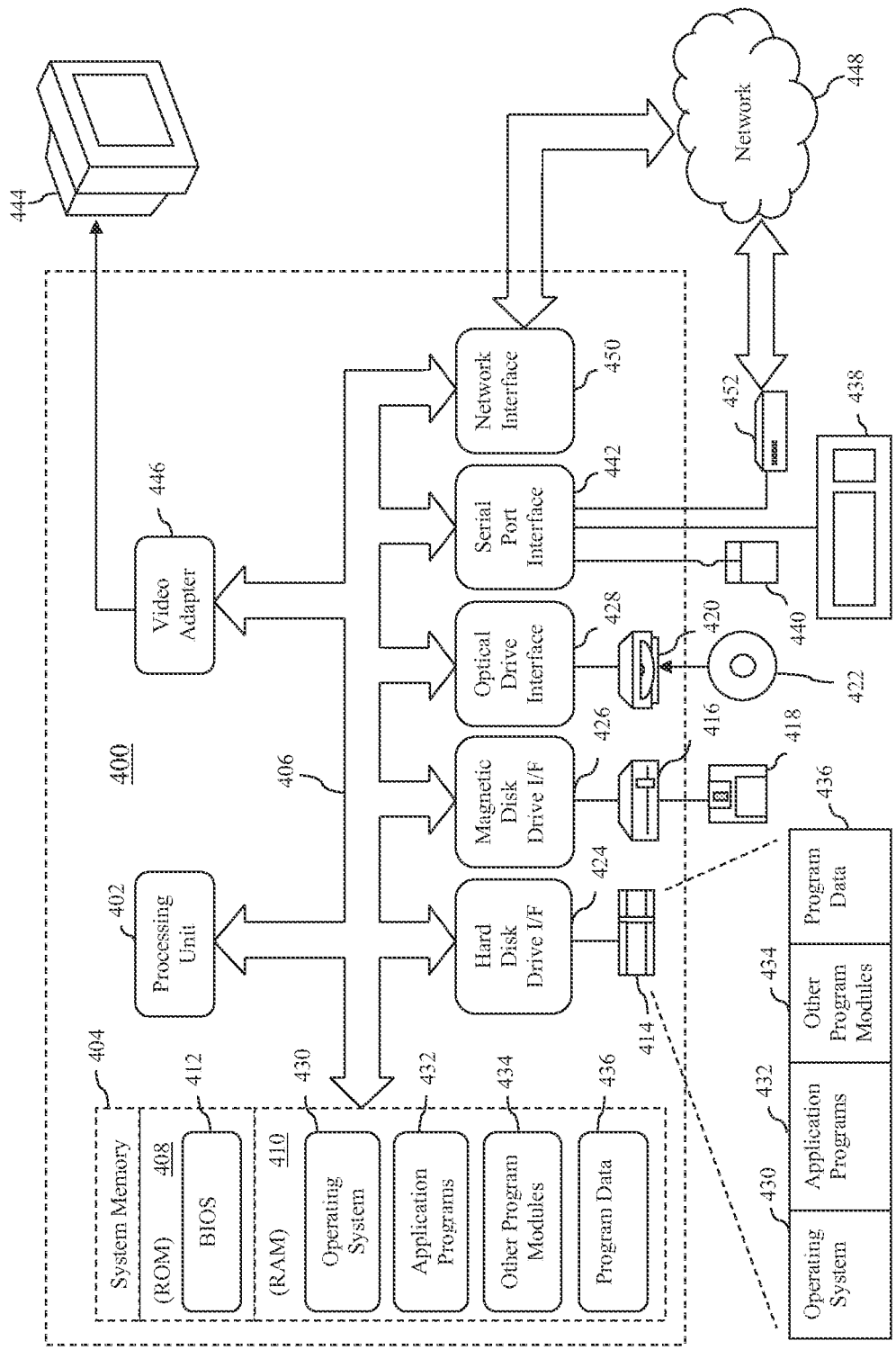
FIG. 4 is a block diagram of an example processor-based computer system that may be used to implement various embodiments.

FIG. 4 depicts an example processor-based computer system 400 that may be used to implement various embodiments described herein. For example, system 400 may be used to execute one or more of the components of system 100 as described above in reference to FIG. 1. The description of system 400 provided herein is provided for purposes of illustration, and is not intended to be limiting. Embodiments may be implemented in further types of computer systems, as would be known to persons skilled in the relevant art(s).

As shown in FIG. 4, system 400 includes a processing unit 402, a system memory 404, and a bus 406 that couples various system components including system memory 404 to processing unit 402. Processing unit 402 may comprise one or more processors or processing cores. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

System 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 422 such as a CD ROM, DVD ROM, BLU-RAY™ disk or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 430, one or more application programs 432, other program modules 434, and program data 436. In accordance with various embodiments, the program modules may include computer program logic that is executable by processing unit 402 to perform any or all of the functions and features of system 100 as described above in reference to FIG. 1, as well as any components thereof. The program modules may also include computer program logic that, when executed by processing unit 402, performs any of the steps or operations shown or described in reference to flowchart 200 of FIG. 2 and flowchart 300 of FIG. 3.

A user may enter commands and information into system 400 through input devices such as a keyboard 438 and a pointing device 440. Other input devices (not shown) may include a microphone, joystick, game controller, scanner, or the like. In one embodiment, a touch screen is provided in conjunction with a display 444 to allow a user to provide user input via the application of a touch (as by a finger or stylus for example) to one or more points on the touch screen. These and other input devices are often connected to processing unit 402 through a serial port interface 442 that is coupled to bus 406, but may be connected by other interfaces, such as a parallel port, game port, or a universal serial bus (USB). Such interfaces may be wired or wireless interfaces.

A display 444 is also connected to bus 406 via an interface, such as a video adapter 446. In addition to display 444, system 400 may include other peripheral output devices (not shown) such as speakers and printers.

System 400 is connected to a network 448 (e.g., a local area network or wide area network such as the Internet) through a network interface 450, a modem 452, or other suitable means for establishing communications over the network. Modem 452, which may be internal or external, is connected to bus 406 via serial port interface 442.

As used herein, the terms "computer program medium," "computer-readable medium," and "computer-readable storage medium" are used to generally refer to storage devices or storage structures such as the hard disk associated with hard disk drive 414, removable magnetic disk 418, removable optical disk 422, as well as other storage device or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 432 and other program modules 434) may be stored on the hard disk, magnetic disk, optical disk, ROM, or RAM. Such computer programs may also be received via network interface 450, serial port interface 442, or any other interface type. Such computer programs, when executed or loaded by an application, enable system 400 to implement features of embodiments of the present invention discussed herein. Accordingly, such computer programs represent controllers of system 400.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 100 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed by a development tool for provisioning Web site resources in a Web hosting environment, the method comprising:
   determining that a user of the development tool has invoked functionality thereof by interacting with a user interface of the development tool to create a first version of a Web site in a local Web development environment;
   in response to the determining step, and without further action by the user,
      automatically identifying one or more local resources associated with the first version of the Web site, the one or more local resources comprising a local database; and
      for each local resource identified in the identifying step, automatically interacting with at least one entity within the Web hosting environment to automatically cause a companion resource to be provisioned in the Web hosting environment, the Web hosting environment being remote with respect to the local Web development environment and at least one companion resource comprising a companion database corresponding logically to the local database.

2. The method of claim 1, wherein the interacting step further comprises:
   interacting with at least one entity within the Web hosting environment to configure a published version of the Web site to utilize at least one companion resource.

3. The method of claim 1, further comprising:
   automatically assigning at least one of a database name, database user name and database password for the companion database.

4. The method of claim 1, further comprising:
   obtaining at least one of a database name, database user name, and database password for the companion database from the user of the development tool.

5. The method of claim 1, wherein the one or more local resources associated with the first version of the Web site comprises a Web site name associated with the first version of the Web site and wherein the interacting step comprises:
   interacting with the at least one entity within the Web hosting environment to cause a Web site domain name to be provisioned in the Web hosting environment, the Web site domain name including the Web site name associated with the first version of the Web site.

6. The method of claim 1, wherein the interacting step comprises:
   invoking at least one application programming interface exposed by the Web hosting environment to cause the companion resource to be provisioned in the Web hosting environment.

7. The method of claim 1, wherein the Web hosting environment comprises a cloud Web hosting environment.

8. The method of claim 1, further comprising:
   determining that the provisioning of a particular companion resource within the Web hosting environment cannot be performed due to a quota being reached; and
   in response to determining that the provisioning of the particular companion resource within the Web hosting environment cannot be performed due to the quota being reached, providing the user of the development tool with one or more of an option to pay for the provisioning of the particular companion resource or an option to cancel the provisioning of the particular companion resource.

9. The method of claim 1, further comprising:
   determining that the provisioning of a particular companion resource within the Web hosting environment has failed; and
   in response to determining that the provisioning of the particular companion resource in the Web hosting environment has failed, interacting with at least one entity within the Web hosting environment at a subsequent time to cause the particular companion resource to be provisioned within the Web hosting environment.

10. A computer program product comprising a computer readable storage device having computer program logic stored thereon, the computer program logic comprising:
    first computer program logic that, when executed by a processing unit, determines that a user of a development tool has invoked functionality thereof by interacting with a user interface of the development tool to publish a first version of a Web site created in a local Web development environment;
    second computer program logic that is executed by the processing unit in response to the determination by the first computer program logic and without further action by the user, and that, when executed by the processing unit,
       automatically identifies one or more local resources associated with the first version of the Web site, the one or more local resources comprising a local database, and,
       for each local resource so identified, automatically interacts with at least one entity within a Web hosting environment to cause a companion resource to be provisioned in the Web hosting environment, the Web hosting environment being remote with respect to the local Web development environment and at least one companion resource comprising a companion database corresponding logically to the local database.

11. The computer program product of claim 10, wherein the second computer program logic, when executed by the processing unit, interacts with at least one entity within the Web hosting environment to configure a published version of the Web site to utilize at least one companion resource.

12. The computer program product of claim 10, wherein the one or more local resources associated with the first version of the Web site comprises a Web site name associated with the first version of the Web site and wherein the second computer program logic comprises:
computer program logic that, when executed by the processing unit, interacts with the at least one entity within the Web hosting environment to cause a Web site domain name to be provisioned in the Web hosting environment, the Web site domain name including the Web site name associated with the first version of the Web site.

13. The computer program product of claim 10, wherein the second computer program logic comprises:
computer program logic that, when executed by the processing unit, invokes at least one application programming interface exposed by the Web hosting environment to cause the companion resource to be provisioned in the Web hosting environment.

14. The computer program product of claim 10, wherein the Web hosting environment comprises a cloud Web hosting environment.

15. A system, comprising:
one or more processors; and
a storage medium that stores computer program logic that is executable by the one or more processors, the computer program logic comprising a development tool that includes:
resource detection logic that, when executed by the one or more processors, determines that a user of the development tool has invoked functionality thereof to publish a first version of a Web site and, in response to the determination and without further action from the user, automatically identifies one or more local resources associated with the first version of the Web site, the one or more local resources identified by the resource detection logic including at least one local database; and
provisioning logic that, when executed by the one or more processors, automatically interacts with at least one entity within a Web hosting environment to cause a companion resource to be provisioned in the Web hosting environment for each local resource identified by the resource detection logic, the Web hosting environment being remote to the system and at least one companion resource comprising a companion database corresponding logically to the local database.

16. The system of claim 15, wherein the provisioning logic interacts with at least one entity within the Web hosting environment to configure a published version of the Web site to utilize at least one companion resource.

17. The system of claim 15, wherein the resource detection logic and the provisioning logic are configured to perform their respective functions in response to a determination that the user of the development tool has created the first version of the Web site.

18. The system of claim 15, wherein the resource detection logic and the provisioning logic are configured to perform their respective functions in response to a determination that the user of the development intends to publish the first version of the Web site.

19. The method of claim 1, wherein the automatically identifying and automatically interacting steps are performed in response to a determining that the user of the development tool intends to publish the first version of the Web site.

20. The computer program product of claim 10, wherein the second computer program logic is executed in response to a determination that the user of the development tool intends to publish the first version of the Web site.

\* \* \* \* \*